US008871015B2

(12) United States Patent
Deroover

(10) Patent No.: US 8,871,015 B2

(45) Date of Patent: Oct. 28, 2014

(54) NON-AQUEOUS PIGMENT DISPERSIONS USING DISPERSION SYNERGISTS

(75) Inventor: Geert Deroover, Lier (BE)

(73) Assignee: Agfa Graphics NV, Mortsel (BE)

( * ) Notice: Subject to any disclaimer, the term of this patent is extended or adjusted under 35 U.S.C. 154(b) by 353 days.

(21) Appl. No.: 13/501,256

(22) PCT Filed: Oct. 15, 2010

(86) PCT No.: PCT/EP2010/065506

§ 371 (c)(1),
(2), (4) Date: Apr. 11, 2012

(87) PCT Pub. No.: WO2011/054652

PCT Pub. Date: May 12, 2011

(65) Prior Publication Data

US 2012/0200650 A1 Aug. 9, 2012

Related U.S. Application Data

(60) Provisional application No. 61/259,660, filed on Nov. 10, 2009.

(30) Foreign Application Priority Data

Nov. 3, 2009 (EP) .................................... 09174941

(51) Int. Cl.

| | |
|---|---|
| ***C09D 11/02*** | (2014.01) |
| ***C08K 5/22*** | (2006.01) |
| ***C08K 5/3437*** | (2006.01) |
| ***C08K 5/3447*** | (2006.01) |
| ***C09B 48/00*** | (2006.01) |
| ***C09B 29/33*** | (2006.01) |
| ***C09B 67/22*** | (2006.01) |
| ***C09B 67/20*** | (2006.01) |
| ***C09B 67/46*** | (2006.01) |
| ***C09D 11/101*** | (2014.01) |
| ***C09D 11/326*** | (2014.01) |
| ***C09D 11/36*** | (2014.01) |
| ***C09D 11/40*** | (2014.01) |
| ***C09D 11/30*** | (2014.01) |

(52) U.S. Cl.

CPC ........... *C09B 29/331* (2013.01); *C09B 67/0041* (2013.01); *C09B 67/0051* (2013.01); *C09B 67/0069* (2013.01); *C09B 67/0086* (2013.01); *C09D 11/101* (2013.01); *C09D 11/326* (2013.01); *C09D 11/36* (2013.01); *C09D 11/40* (2013.01); *C09D 11/30* (2013.01)

USPC .................. 106/31.75; 106/31.77; 106/31.78; 106/493; 106/495; 106/497; 106/499; 106/506

(58) Field of Classification Search

USPC ........ 106/31.75, 31.77, 31.78, 493, 495, 497, 106/499, 506; 347/100

See application file for complete search history.

(56) References Cited

U.S. PATENT DOCUMENTS

| | | | | |
|---|---|---|---|---|
| 7,582,150 | B2 * | 9/2009 | Jaunky et al. | 106/31.52 |
| 7,582,151 | B2 * | 9/2009 | Jaunky et al. | 106/31.52 |
| 7,582,152 | B2 * | 9/2009 | Jaunky et al. | 106/31.52 |
| 7,637,994 | B2 * | 12/2009 | Deroover et al. | 106/31.78 |
| 7,704,312 | B2 * | 4/2010 | Deroover et al. | 106/31.75 |
| 7,722,716 | B2 * | 5/2010 | Deroover | 106/493 |
| 7,812,113 | B2 * | 10/2010 | Deroover et al. | 528/367 |
| 8,022,117 | B2 * | 9/2011 | Deroover et al. | 106/31.75 |
| 2008/0312358 | A1 * | 12/2008 | Deroover et al. | 523/333 |

FOREIGN PATENT DOCUMENTS

| | | | | |
|---|---|---|---|---|
| EP | 1 715 007 | A2 | | 10/2006 |
| EP | 1 790 696 | A1 | | 5/2007 |
| EP | 1 790 697 | A1 | | 5/2007 |
| EP | 1 790 698 | A1 | | 5/2007 |
| EP | 1 857 510 | A1 | | 11/2007 |
| JP | 2001-172520 | A | | 6/2001 |
| JP | 2003-128947 | A | | 5/2003 |
| WO | 2007/006635 | A2 | | 1/2007 |
| WO | 2007/060254 | A2 | | 5/2007 |
| WO | WO 2007/060263 | A3 | * | 5/2007 |

OTHER PUBLICATIONS

Official Communication issued in International Patent Application No. PCT/EP2010/065506, mailed on Dec. 13, 2010.

* cited by examiner

*Primary Examiner* — Helene Klemanski

(74) *Attorney, Agent, or Firm* — Keating & Bennett, LLP

(57) ABSTRACT

Non-aqueous pigment dispersions exhibiting improved dispersion quality and/or stability were prepared for a specific selection of naphthol AS pigments, diketopyrrolo-pyrrole pigments and quinacridone pigments, by using specific yellow monoazo dispersion synergists. The non-aqueous pigment dispersions can be advantageously used in inkjet inks inkjet printing methods.

13 Claims, No Drawings

NON-AQUEOUS PIGMENT DISPERSIONS USING DISPERSION SYNERGISTS

CROSS-REFERENCE TO RELATED APPLICATIONS

This application is a 371 National Stage Application of PCT/EP2010/065506, filed Oct. 15, 2010. This application claims the benefit of U.S. Provisional Application No. 61/259,660, filed Nov. 10, 2009, which is incorporated by reference herein in its entirety. In addition, this application claims the benefit of European Application No. 09174941.6, filed Nov. 3, 2009, which is also incorporated by reference herein in its entirety.

BACKGROUND OF THE INVENTION

1. Field of the Invention

The present invention relates to pigmented dispersions and inkjet inks comprising colour pigments that are stabilized by polymeric dispersants in a non-aqueous medium using specific dispersion synergists.

2. Description of the Related Art

A dispersant is a substance for promoting the formation and stabilization of a dispersion of pigment particles in a dispersion medium and for substantially reducing the dispersing energy required. Dispersed pigment particles may have a tendency to re-agglomerate after the dispersing operation, due to mutual attraction forces. The use of dispersants counteracts this re-agglomeration tendency of the pigment particles.

The dispersant has to meet particularly high requirements when used for inkjet inks. Inadequate dispersing manifests itself as increased viscosity in liquid systems, loss of brilliance and/or hue shifts. Moreover, particularly good dispersion quality is required to ensure unimpeded passage of pigment particles through the nozzles of a print head, which are usually only a few micrometers in diameter. In addition, pigment particle agglomeration and the associated blockage of the printer nozzles has to be avoided in the standby periods of the printer.

Polymeric dispersants typically contain in one part of the molecule so-called anchor groups, which adsorb onto the pigments to be dispersed. In a spatially separate part of the molecule, polymeric dispersants have polymer chains compatible with the dispersion medium, thus stabilizing the pigment particles in the dispersion medium. Typical polymeric dispersants include graft copolymer and block copolymer dispersants.

In aqueous inkjet inks, the polymeric dispersants generally contain hydrophobic anchor groups exhibiting a high affinity for the pigment surface and hydrophilic polymer chains for stabilizing the pigments in the aqueous dispersion medium.

The preparation of good thermally stable dispersions with submicron particles is more difficult for non-aqueous pigment dispersions, such as solvent based, oil based and radiation curable inkjet inks. The pigments are especially difficult to disperse when they have a non-polar surface.

These problems have led to the design of very specific polymeric dispersants wherein the anchor groups are pigment derivatives. For example, WO 2007/006635 (AGFA GRAPHICS) discloses pigment dispersions comprising a colour pigment and a polymeric dispersant having via a linking group covalently linked to its polymeric backbone at least one pending chromophore group which has a molecular weight smaller than 90% of the molecular weight of the colour pigment. A disadvantage is that the pending chromophore group must bear some similarity to the chemical formula of the pigment in order to obtain effective dispersion, which as a consequence results in different polymeric dispersants for the different pigments used in an ink set containing yellow, magenta and cyan inks.

Another approach for dispersing pigments with non-polar surfaces in non-aqueous dispersion media is changing the surface to a more polar surface by addition of compounds known as dispersion synergists. A dispersion synergist is a compound that promotes the adsorption of the polymeric dispersant on the surface of the pigment. To be efficient, the synergist should bear some similarity to the pigment. Examples of these dispersion synergists are given in, for example, WO 2007/060254 (AGFA GRAPHICS), EP 1790697 A (AGFA GRAPHICS) and EP 1790698 A (AGFA GRAPHICS)).

However, both approaches lead to a considerable higher cost in composing non-aqueous pigment dispersions for inkjet ink sets, because each pigment dispersion requires anchor groups on the polymeric dispersant or dispersion synergists which chemically resemble the pigments.

For consistent image quality, inkjet inks require a dispersion stability capable of dealing with high temperatures (above 60° C.) during transport of the ink to a customer, jetting at elevated temperatures and changes in the dispersion medium of the inkjet ink during use, for example, evaporation of solvent and increasing concentrations of humectants, penetrants and other additives.

Therefore, it is highly desirable to manufacture low cost non-aqueous pigment dispersions, especially pigmented inkjet inks, exhibiting a high dispersion quality and stability using the same polymeric dispersant in all inks of an ink set.

SUMMARY OF THE INVENTION

In order to overcome the problems described above, it has been surprisingly found that non-aqueous pigment dispersions, especially non-aqueous inkjet inks, of high dispersion quality and stability were obtained by a combination of a specific naphthol AS pigment, diketopyrrolo-pyrrole pigment or quinacridone pigment using a specific yellow monoazo dispersion synergist as defined below. The yellow colour of the dispersion synergist had no negative effect on the colour of the magenta pigment dispersion. CMYK inkjet ink sets could be made using the same yellow dispersion synergist and polymeric dispersant in the yellow and magenta inkjet inks.

According to preferred embodiments of the present invention images of high image quality with non-aqueous pigment dispersions, especially with non-aqueous inkjet inks, can be produced.

The above and other elements, features, steps, characteristics and advantages of the present invention will become more apparent from the following detailed description of the preferred embodiments.

DETAILED DESCRIPTION OF THE PREFERRED EMBODIMENTS

The term "C.I." is used in disclosing the present application as an abbreviation for Colour Index.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methylbutyl etc.

Non-Aqueous Pigment Dispersions and Inkjet Inks

The non-aqueous pigment dispersion according to a preferred embodiment of the present invention includes a non-aqueous dispersion medium, a polymeric dispersant, a pigment and a dispersion synergist, wherein the dispersion synergist is represented by Formula (I):

Formula (I)

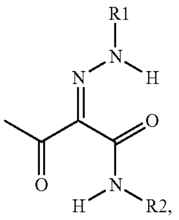

with one of R1 and R2 being represented by the group

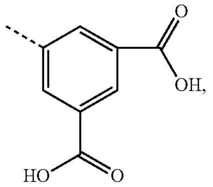

and the other one of R1 and R2 being represented by the group

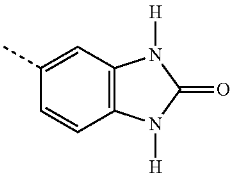

or

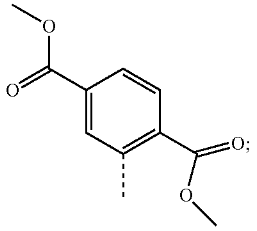

and wherein the pigment is selected from the group consisting of naphthol AS pigments C.I. Pigment Red 170 and 210, diketopyrrolo-pyrrole pigments, unsubstituted quinacridone, dimethyl substituted quinacridone pigments, dichloro substituted quinacridone pigments and mixed crystals of two or more quinacridones selected from the group consisting of unsubstituted quinacridone, dimethyl substituted quinacridones and dichloro substituted quinacridones.

The non-aqueous pigment dispersion can be advantageously used in paints, lacquers, e.g. automotive lacquers, and printing inks for applications in inkjet, offset, flexography and the like. The non-aqueous pigment dispersion is preferably curable by UV radiation or e-beam.

In one preferred embodiment, the non-aqueous pigment dispersion is an inkjet ink, more preferably an inkjet ink curable by UV radiation or e-beam.

The non-aqueous pigmented dispersion according to a preferred embodiment of the present invention may further also contain at least one surfactant to control the homogenous spreading of the pigment dispersion on a substrate. For a non-aqueous pigmented inkjet ink, the surfactant is important to control the dot size of the ink droplet on a substrate.

In a preferred embodiment the non-aqueous pigmented dispersion is a non-aqueous inkjet ink containing at least one humectant to prevent the clogging of the nozzle, due to its ability to slow down the evaporation rate of ink.

The viscosity of an inkjet ink is preferably lower than 30 mPa·s, more preferably lower than 15 mPa·s, and most preferably between 2 and 10 mPa·s at a shear rate of 100 $s^{-1}$ and a jetting temperature between 10 and 70° C.

The non-aqueous inkjet ink forms preferably part of a non-aqueous CMY(K) inkjet ink set. The non-aqueous CMY(K) inkjet ink set may also be extended with extra inks such as red, green, blue, and/or orange to further enlarge the colour gamut of the image. The CMY(K) ink set may also be extended by the combination of full density and light density inks of both colour inks and/or black inks to improve the image quality by lowered graininess. The preferred pigments in a cyan ink are C.I. Pigment Blue 15:3 and 15:4. The preferred pigment in a black ink is carbon black.

Pigments

The pigment is selected from the group consisting of naphthol AS pigments C.I. Pigment Red 170 and 210, diketopyrrolo-pyrrole pigments, unsubstituted quinacridone, dimethyl substituted quinacridone pigments, dichloro substituted quinacridone pigments and mixed crystals of quinacridones wherein all the quinacridones present in the mixed crystal are selected from the group consisting of unsubstituted quinacridone, dimethyl substituted quinacridones and dichloro substituted quinacridones.

In a preferred embodiment of the non-aqueous pigment dispersion according to the present invention, the pigment is selected from the group consisting of C.I. Pigment Violet 19, C.I. Pigment Red 122, C.I. Pigment Red 202, C.I. Pigment Red 209 and mixed crystals thereof.

In a preferred embodiment of the non-aqueous pigment dispersion according to the present invention, the diketopyrrolo-pyrrole pigment is selected from the group consisting of C.I. Pigment Red 254 and C.I. Pigment Orange 71.

The pigments are preferably present in the range of 0.05 to 20%, more preferably in the range of 0.1 to 10% by weight and most preferably in the range of 1 to 6% by weight, each based on the total weight of the pigment dispersion or inkjet ink.

Dispersion Synergists

The dispersion synergists used in the non-aqueous pigment dispersions are known from EP 1790697 A (AGFA GRAPHICS) for dispersing yellow pigments having a similar chemical structure. The synthesis of these dispersion synergists is described in EP 1790697 A (AGFA GRAPHICS), which therefore is incorporated herein as a specific reference.

The dispersion synergists suitable in the present invention are given in Table 1.

TABLE 1

| | |
|---|---|
| DS-1 | 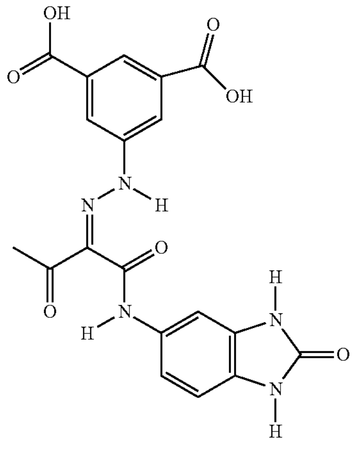 [SMILES: CC(=O)/C(=N/Nc1cc(C(=O)O)cc(C(=O)O)c1)C(=O)Nc1ccc2[nH]c(=O)[nH]c2c1] |

TABLE 1-continued

DS-2

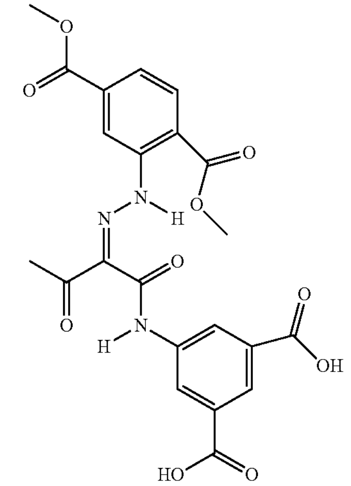 [SMILES: COC(=O)c1ccc(C(=O)OC)c(N/N=C(/C(C)=O)C(=O)Nc2cc(C(=O)O)cc(C(=O)O)c2)c1]

DS-3

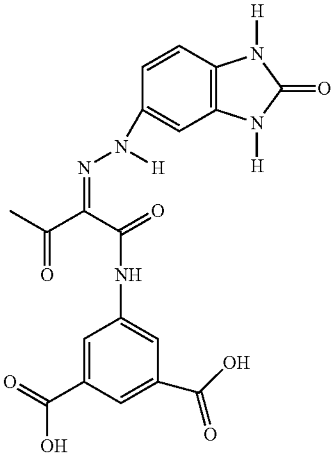 [SMILES: CC(=O)/C(=N/Nc1ccc2[nH]c(=O)[nH]c2c1)C(=O)Nc1cc(C(=O)O)cc(C(=O)O)c1]

DS-4

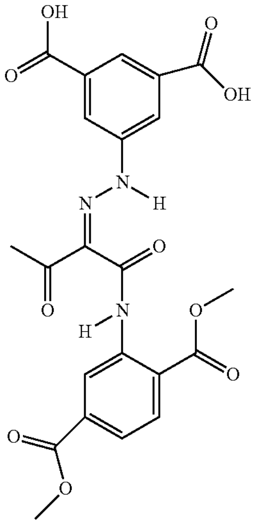 [SMILES: COC(=O)c1ccc(C(=O)OC)c(NC(=O)/C(=N\Nc2cc(C(=O)O)cc(C(=O)O)c2)C(C)=O)c1]

The most preferred dispersion synergists are DS-1 and DS-2.

The synergist should be additional to the amount of polymeric dispersant(s). The ratio of polymeric dispersant/dispersion synergist depends upon the pigment and should be determined experimentally. Typically the ratio wt % polymeric dispersant/wt % dispersion synergist is selected between 2:1 to 100:1, preferably between 2:1 and 20:1.

Non-Aqueous Dispersion Media

The dispersion medium used in the pigment dispersion according to a preferred embodiment of the present invention is a non-aqueous liquid. The dispersion medium may consist of organic solvent(s), but may also be a radiation curable liquid which can be cured by UV-radiation or e-beam.

Suitable organic solvents include alcohols, aromatic hydrocarbons, ketones, esters, aliphatic hydrocarbons, higher fatty acids, carbitols, cellosolves, higher fatty acid esters. Suitable alcohols include methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used.

Suitable examples of organic solvents are disclosed in [0133] to [0146] of EP 1857510 A (AGFA GRAPHICS).

If the pigment dispersion is a curable pigment dispersion or inkjet ink, organic solvent(s) are preferably fully replaced by one or more monomers and/or oligomers to obtain the liquid dispersion medium. Sometimes, it can be advantageous to add a small amount of an organic solvent to improve the dissolution of the dispersant. The content of organic solvent should be lower than 20 wt %, more preferably lower than 5 wt % based on the total weight of the pigmented inkjet ink and most preferably the curable pigment dispersion doesn't include any organic solvent.

For oil based pigment dispersions and inkjet inks, the dispersion medium can be any suitable oil including aromatic oils, paraffinic oils, extracted paraffinic oils, naphthenic oils, extracted napthenic oils, hydrotreated light or heavy oils, vegetable oils and derivatives and mixtures thereof. Paraffinic oils can be normal paraffin types (octane and higher alkanes), isoparaffins (isooctane and higher iso-alkanes) and cycloparaffins (cyclooctane and higher cyclo-alkanes) and mixtures of paraffin oils.

Suitable examples of oils are disclosed in [0151] to [0164] of EP 1857510 A (AGFA GRAPHICS).

Monomers and Oligomers

The monomers and oligomers used in radiation curable pigment dispersions and inks, especially for food packaging applications, are preferably purified compounds having no or almost no impurities, more particularly no toxic or carcinogenic impurities. The impurities are usually derivative compounds obtained during synthesis of the polymerizable compound. Sometimes, however, some compounds may be added deliberately to pure polymerizable compounds in harmless amounts, for example, polymerization inhibitors or stabilizers.

Any monomer or oligomer capable of free radical polymerization may be used as polymerizable compound. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. The viscosity of the radiation curable compositions and inks can be adjusted by varying the ratio between the monomers and oligomers.

Particularly preferred monomers and oligomers are those listed in [0106] to [0115] in EP 1911814 A (AGFA GRAPHICS) incorporated herein as a specific reference.

A preferred class of monomers and oligomers are vinyl ether acrylates such as those described in U.S. Pat. No. 6,310, 115 (AGFA), incorporated herein by reference. Particularly preferred compounds are 2-(2-vinyloxyethoxy)ethyl(meth) acrylate, most preferably the compound is 2-(2-vinyloxyethoxy)ethyl acrylate.

Polymeric Dispersants

Typical polymeric dispersants are copolymers of two monomers but may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable polymeric dispersants are listed in the section on “Dispersants”, more specifically [0064] to [0070] and [0074] to [0077], in EP 1911814 A (AGFA GRAPHICS) incorporated herein as a specific reference.

The polymeric dispersant has preferably a number average molecular weight Mn between 500 and 30,000, more preferably between 1,500 and 10,000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:

- DISPERBYK™ dispersants available from BYK CHEMIE GMBH;
- SOLSPERSE™ dispersants available from NOVEON;
- TEGO™ DISPERS™ dispersants from EVONIK;
- EDAPLAN™ dispersants from MÜNZING CHEMIE;
- ETHACRYL™ dispersants from LYONDELL;
- GANEX™ dispersants from ISP;
- DISPEX™ and EFKA™ dispersants from CIBA SPECIALTY CHEMICALS INC;
- DISPONER™ dispersants from DEUCHEM; and
- JONCRYL™ dispersants from JOHNSON POLYMER.

Particularly preferred polymeric dispersants include SOLSPERSE™ dispersants from NOVEON, EFKA™ dispersants from CIBA SPECIALTY CHEMICALS INC and DISPERBYK™ dispersants from BYK CHEMIE GMBH. Particularly preferred dispersants are SOLSPERSE™ 32000, 35000 and 39000 dispersants from NOVEON.

The polymeric dispersant is preferably used in an amount of 2 to 600 wt %, more preferably 5 to 200 wt %, most preferably 50 to 90 wt % based on the weight of the pigment.

Photoinitiators

If the pigment dispersion or ink is radiation curable, preferably one or more photoinitiators are present in the pigment dispersion or ink.

The photoinitiator is preferably a free radical initiator. A free radical photoinitiator is a chemical compound that initiates a polymerization of monomers and oligomers when exposed to actinic radiation by the formation of a free radical.

Two types of free radical photoinitiators can be distinguished and used in the pigment dispersion or ink of a preferred embodiment of the present invention. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in a preferred embodiment of the present invention, alone or in combination.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6-trimethylbenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone, diphenyliodonium fluoride and triphenylsulfonium hexafluophosphate.

Suitable commercial photo-initiators include IRGACURE™ 184, IRGACURE™ 500, IRGACURE™ 907, IRGACURE™ 369, IRGACURE™ 1700, IRGACURE™ 651, IRGACURE™ 819, IRGACURE™ 1000, IRGACURE™ 1300, IRGACURE™ 1870, DAROCUR™ 1173, DAROCUR™ 2959, DAROCUR™ 4265 and DAROCUR™ ITX available from CIBA SPECIALTY CHEMICALS, LUCERIN™ TPO available from BASF AG, ESACURE™ KT046, Esacure™ KIP150, ESACURE™ KT37 and ESACURE™ EDB available from LAMBERTI, H-NU™ 470 and H-NU™ 470X available from SPECTRA GROUP Ltd.

Suitable cationic photo-initiators include compounds, which form aprotic acids or Bronsted acids upon exposure to ultraviolet and/or visible light sufficient to initiate polymerization. The photo-initiator used may be a single compound, a mixture of two or more active compounds, or a combination of two or more different compounds, i.e. co-initiators. Non-limiting examples of suitable cationic photo-initiators are aryldiazonium salts, diaryliodonium salts, triarylsulfonium salts, triarylselenonium salts and the like.

However for safety reasons, in particular for food packaging applications, the photoinitiator is preferably a so-called diffusion hindered photoinitiator. A diffusion hindered photoinitiator is a photoinitiator which exhibits a much lower mobility in a cured layer of the curable liquid or ink than a monofunctional photoinitiator, such as benzophenone. Several methods can be used to lower the mobility of the photoinitiator. One way is to increase the molecular weight of the photoinitiator so that the diffusion speed is reduced, e.g. difunctional photoinitiators or polymeric photoinitiators. Another way is to increase its reactivity so that it is built into the polymerizing network, e.g. multifunctional photoinitiators and polymerizable photoinitiators. The diffusion hindered photoinitiator is preferably selected from the group consisting of non-polymeric di- or multifunctional photoinitiators, oligomeric or polymeric photoinitiators and polymerizable photoinitiators. Non-polymeric di- or multifunctional photoinitiators are considered to have a molecular weight between 300 and 900 Dalton. Non-polymerizable monofunctional photoinitiators with a molecular weight in that range are not diffusion hindered photoinitiators. Most preferably the diffusion hindered photoinitiator is a polymerizable initiator.

A suitable diffusion hindered photoinitiator may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulfides, α-haloketones, α-halosulfones and phenylglyoxalates.

A suitable diffusion hindered photoinitiator may contain one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2053101 A (AGFA GRAPHICS) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

A preferred amount of photoinitiator is 0-50 wt %, more preferably 0.1-20 wt %, and most preferably 0.3-15 wt % of the total weight of the curable pigment dispersion or ink.

In order to increase the photosensitivity further, the curable pigment dispersion or ink may additionally contain co-initiators. Suitable examples of co-initiators can be categorized in 4 groups:

(1) tertiary aliphatic amines such as methyldiethanolamine, dimethylethanolamine, triethanolamine, triethylamine and N-methylmorpholine;

(2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino) benzoate; and (3) (meth)acrylated amines such as dialkylamino alkyl(meth) acrylates (e.g., diethylaminoethylacrylate) or N-morpholinoalkyl-(meth)acrylates (e.g., N-morpholinoethyl-acrylate).

The preferred co-initiators are aminobenzoates.

When one or more co-initiators are included into the curable pigment dispersion or ink according to a preferred embodiment of the present invention, preferably these co-initiators are diffusion hindered for safety reasons, in particular for food packaging applications.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator having at least one (meth)acrylate group, more preferably having at least one acrylate group.

Preferred diffusion hindered co-initiators are the polymerizable co-initiators disclosed in EP 2053101 A (AGFA GRAPHICS) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 (AGFA) incorporated herein as a specific reference.

The curable pigment dispersion or ink preferably comprises the diffusion hindered co-initiator in an amount of 0.1 to 50 wt %, more preferably in an amount of 0.5 to 25 wt %, most preferably in an amount of 1 to 10 wt % of the total weight of the ink.

Polymerization Inhibitors

The curable pigment dispersion may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, SUMILIZER™ GA-80, SUMILIZER™ GM and SUMILIZER™ GS produced by Sumitomo Chemical Co. Ltd.; GENORAD™ 16, GENORAD™ 18 and GENORAD™ 20 from Rahn AG; IRGASTAB™ UV10 and IRGASTAB™ UV22, TINUVIN™ 460 and CGS20 from Ciba Specialty Chemicals; FLOORSTAB™ UV range (UV-1, UV-2, UV-5 and UV-8) from Kromachem Ltd, ADDITOL™ S range (S100, 5110, 5120 and 5130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total pigment dispersion or ink.

Binders

Non-aqueous pigment dispersions based on organic solvents or oils preferably include a binder resin. The binder functions as a viscosity controlling agent and also provides fixability relative to the polymeric resin substrate, e.g. a polyvinyl chloride substrate, also called vinyl substrate. The binder must be selected to have a good solubility in the solvent(s).

Suitable examples of binder resins include acrylic resins, modified acrylic resins, styrene acrylic resins, acrylic copolymers, acrylate resins, aldehyde resins, rosins, rosin esters, modified rosins and modified rosin resins, acetyl polymers, acetal resins such as polyvinyl butyral, ketone resins, phenolic resins and modified phenolic resins, maleic resins and modified maleic resins, terpene resins, polyester resins, polyamide resins, polyurethane resins, epoxy resins, vinyl resins, vinyl chloride-vinyl acetate copolymer resins, cellulose type resins such as nitro cellulose, cellulose acetopropionate and cellulose acetate butyrate, and vinyl toluene-α-methylstylene copolymer resin. These binders may be used alone or in a mixture thereof. The binder is preferably a film-forming thermoplastic resin.

The amount of binder resin in a pigment dispersion or ink is preferably in the range of 0.1 to 30 wt %, more preferably 1 to 20 wt %, most preferably 2 to 10 wt % based on the total weight of the pigment dispersion or ink.

Surfactants

The pigment dispersion or ink may contain at least one surfactant. The surfactant(s) can be anionic, cationic, nonionic, or zwitter-ionic and are usually added in a total quantity less than 20 wt % based on the total weight of the inkjet ink and particularly in a total less than 10 wt % based on the total weight of the pigment dispersion or ink.

Suitable surfactants include fluorinated surfactants, fatty acid salts, ester salts of a higher alcohol, alkylbenzene sulfonate salts, sulfosuccinate ester salts and phosphate ester salts of a higher alcohol (for example, sodium dodecylbenzenesulfonate and sodium dioctylsulfosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

For non-aqueous inkjet inks preferred surfactants are selected from fluoro surfactants (such as fluorinated hydrocarbons) and silicone surfactants. The silicones are typically siloxanes and can be alkoxylated, polyether modified, polyether modified hydroxy functional, amine modified, epoxy modified and other modifications or combinations thereof. Preferred siloxanes are polymeric, for example polydimethylsiloxanes.

In a curable inkjet ink a fluorinated or silicone compound as disclosed above may be used as a surfactant, but preferably a cross-linkable surfactant is used. Polymerizable monomers having surface-active effects include silicone modified acrylates, silicone modified methacrylates, acrylated siloxanes, polyether modified acrylic modified siloxanes, fluorinated acrylates, and fluorinated methacrylates. Polymerizable monomers having surface-active effects can be mono-, di-, tri- or higher functional (meth)acrylates or mixtures thereof.

Humectants/Penetrants

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are triethylene glycol mono butylether, glycerol and 1,2-hexanediol.

The humectant is preferably added to the inkjet ink formulation in an amount of 0.1 to 40 wt % of the formulation, more preferably 0.1 to 10 wt % of the formulation, and most preferably approximately 4.0 to 6.0 wt %.

Preparation of Pigment Dispersions and Inks

Pigment dispersions may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium beads.

In the process of mixing, milling and dispersion, each process is performed with cooling to prevent build up of heat, and for radiation curable pigment dispersions as much as possible under light conditions in which actinic radiation has been substantially excluded.

The pigment dispersion may contain more than one pigment, the pigment dispersion or ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, the selected mechanical means and residence conditions, the initial and desired final particle size, etc. In a preferred embodiment of the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

Spectral Separation Factor

The spectral separation factor SSF was found to be an excellent measure to characterize a pigmented inkjet ink, as it takes into account properties related to light-absorption (e.g. wavelength of maximum absorbance $\lambda_{max}$, shape of the absorption spectrum and absorbance-value at $\lambda_{max}$) as well as properties related to the dispersion quality and stability.

A measurement of the absorbance at a higher wavelength gives an indication on the shape of the absorption spectrum. The dispersion quality can be evaluated based on the phenomenon of light scattering induced by solid particles in solutions. When measured in transmission, light scattering in pigment inks may be detected as an increased absorbance at higher wavelengths than the absorbance peak of the actual pigment. The dispersion stability can be evaluated by comparing the SSF before and after a heat treatment of e.g. a week at 80° C.

The spectral separation factor SSF of the ink is calculated by using the data of the recorded spectrum of an ink solution or a jetted image on a substrate and comparing the maximum absorbance to the absorbance at a higher reference wavelength $\lambda_{ref}$. The spectral separation factor is calculated as the ratio of the maximum absorbance $A_{max}$ over the absorbance $A_{ref}$ at a reference wavelength.

$$SSF = \frac{A_{max}}{A_{ref}}$$

The SSF is an excellent tool to design inkjet ink sets with large colour gamut. Often inkjet ink sets are now commercialized, wherein the different inks are not sufficiently matched with each other. For example, the combined absorption of all inks does not give a complete absorption over the whole visible spectrum, e.g. "gaps" exist between the absorption spectra of the colorants. Another problem is that one ink might be absorbing in the range of another ink. The resulting colour gamut of these inkjet ink sets is low or mediocre.

EXAMPLES

Materials

All materials used in the following examples were readily available from standard sources such as ALDRICH CHEMICAL Co. (Belgium) and ACROS (Belgium) unless otherwise specified.

PR170 is NOVOPERM™ Red F6RK which is a C.I. Pigment Red 170 pigment available from CLARIANT.

PR184 is PERMANENT™ Rubine F6B which is a C.I. Pigment Red 184 pigment available from CLARIANT.

PR210 is PERMANENT™ Red P FK which is a C.I. Pigment Red 170 pigment available from CLARIANT.

PR122 is CHROMOFINE™ Magenta 6878 which is a C.I. Pigment Red 122 pigment available from CLARIANT.

PV19 is INK JET RED™ E5B02 VP2984 which is a C.I. Pigment Violet 19 pigment available from CLARIANT.

PR202 is CINQUASIA™ Magenta RT235D which is a C.I. Pigment Red 202 pigment available from CLARIANT.

PR209 is HOSTAPERM™ Red EG Transparant which is a C.I. Pigment Red 209 pigment available from CLARIANT.

PR282 is IRGAZIN™ Magenta 2012 which is a C.I. Pigment Red 282 pigment available from CIBA-GEIGY.

PV19/PR202 is CROMOPHTAL™ Jet Magenta 2BC which is a mixed crystal of C.I. Pigment Violet 19 and C.I. Pigment Red 122 available from CIBA-GEIGY.

PR254 is IRGAZIN™ DPP Red BTR which is a C.I. Pigment Red 254 pigment available from CIBA-GEIGY.

PO71 is CROMOPHTAL™ DPP Orange TR which is a C.I. Pigment Orange 71 pigment available from CIBA-GEIGY.

S39000 is SOLSPERSE™ 39000, a polyethyleneimine core grafted with polyester-hyperdispersant from LUBRIZOL. DEGDEE is diethylene glycol diethyl ether.

DS-1 is the dispersion synergist according to Formula DS-1 and was synthesized in the same manner as described in EP 1790697 A (AGFA GRAPHICS) for the synergist SYN-8 (see Example 3).

DS-2 is the dispersion synergist according to Formula DS-2 and was synthesized in the same manner as described in EP 1790697 A (AGFA GRAPHICS) for the synergist SYN-29 (see Example 3).

Measurement Methods 1. SSF

The spectral separation factor SSF of the ink was calculated by using the data of the recorded spectrum of an ink solution and comparing the maximum absorbance to the absorbance at a reference wavelength. The reference wavelength is dependent on the pigment(s) used:

- if the colour ink has a maximum absorbance $A_{max}$ between 400 and 500 nm then the absorbance $A_{ref}$ must be determined at a reference wavelength of 600 nm,
- If the colour ink has a maximum absorbance $A_{max}$ between 500 and 600 nm then the absorbance $A_{ref}$ must be determined at a reference wavelength of 650 nm,
- If the colour ink has a maximum absorbance $A_{max}$ between 600 and 700 nm then the absorbance $A_{ref}$ must be determined at a reference wavelength of 830 nm.

The absorbance was determined in transmission with a Shimadzu UV-2101 PC double beam-spectrophotometer. The inks were diluted with ethyl acetate to have a pigment concentration of 0.002 wt % based on the total weight of the ink. Quinacridone containing pigments were measured at a dilution of 0.005 wt % based on the total weight of the ink due to their lower extinction.

A spectrophotometric measurement of the UV-VIS-NIR absorption spectrum of the diluted ink was performed in transmission-mode with a double beam-spectrophotometer using the settings of Table 2. Quartz cells with a path length of 10 mm were used and ethyl acetate was chosen as a blank.

TABLE 2

| Mode | Absorbance |
|---|---|
| Wavelength range | 240-900 nm |
| Slit width | 2.0 nm |
| Scan interval | 1.0 nm |
| Scan speed | Fast (1165 nm/min) |
| Detector | photo-multiplier (UV-VIS) |

Efficient pigmented inkjet inks exhibiting a narrow absorption spectrum and a high maximum absorbance have a value for SSF of at least 30.

2. Pigment Dispersion Stability

The dispersion stability was evaluated by comparing the SSF before and after a heat treatment of one week at 80° C. Pigmented inkjet inks exhibiting good dispersion stability have a SSF after heat treatment still larger than 30 and a loss in SSF of no more than 30%.

3. Average Particle Size

The particle size of pigment particles in pigmented inkjet ink was determined by photon correlation spectroscopy at a wavelength of 633 nm with a 4 mW HeNe laser on a diluted sample of the pigmented inkjet ink. The particle size analyzer used was a MALVERN™ nano-S available from Goffin-Meyvis.

The sample was prepared by addition of one drop of ink to a cuvette containing 1.5 mL ethyl acetate and mixed until a homogenous sample was obtained. The measured particle size is the average value of 3 consecutive measurements consisting of 6 runs of 20 seconds. For good ink jet characteristics (jetting characteristics and print quality) the average particle size of the dispersed particles is below 200 nm, preferably between 70 and 150 nm. The pigmented inkjet ink is considered to be a stable pigment dispersion if the particle size remained below 200 nm after a heat treatment of 7 days at 80° C.

Example 1

This example illustrates how the dispersion quality of a specific selection of pigments can be improved by a synergist having a totally different chemical structure than the pigments.

Preparation and Evaluation of Non-Aqueous Inkjet Inks

All inkjet inks were prepared in the same manner to obtain a composition A or B as described in Table 3, depending on whether or not a dispersion synergist was used.

TABLE 3

| | wt % of component | |
|---|---|---|
| | Formulation A | Formulation B |
| Pigment | 5.00 | 4.50 |
| Dispersion synergist | — | 0.50 |
| S39000 | 5.00 | 5.00 |
| DEGDEE | 90.00 | 90.00 |

A pigment dispersion was made by mixing the pigment, the polymeric dispersant 539000, optionally the dispersion synergist, and the organic solvent DEGDEE with a dissolver and subsequently treating this mixture with a roller mill procedure using yttrium-stabilized zirconium oxide-beads of 0.4 mm diameter ("high wear resistant zirconia grinding media" from TOSOH Co.). A polyethylene flask of 60 mL was filled to half its volume with grinding beads and 20 mL of the mixture. The flask was closed with a lit and put on the roller mill for three days. The speed was set at 150 rpm. After milling, the dispersion was separated from the beads using a filter cloth.

The comparative inkjet inks COMP-11 to COMP-15 and the inventive inkjet inks INV-1 to INV-14 were prepared according to Table 4. The average particle size and the spectral separation factor SSF were determined to evaluate the dispersion quality. The results are also listed in Table 4.

TABLE 4

| Ink | Pigment | Synergist | Dispersion quality SSF | Size (nm) |
|---|---|---|---|---|
| COMP-1 | PR170 | — | 6 | 1070 |
| COMP-2 | PR184 | — | 8 | 1400 |
| COMP-3 | PR184 | DS-1 | 30 | 259 |
| COMP-4 | PR184 | DS-2 | 14 | 659 |
| COMP-5 | PR210 | — | 19 | 470 |
| COMP-6 | PR122 | — | 23 | 382 |
| COMP-7 | PV19 | — | 91 | 85 |
| COMP-8 | PR202 | — | 30 | 291 |
| COMP-9 | PR209 | — | 130 | 70 |
| COMP-10 | PR282 | — | 21 | 554 |
| COMP-11 | PR282 | DS-1 | 35 | 247 |
| COMP-12 | PR282 | DS-2 | 28 | 367 |
| COMP-13 | PV19/PR202 | — | 105 | 87 |
| COMP-14 | PR254 | — | 26 | 336 |
| COMP-15 | PO71 | — | 92 | 119 |
| INV-1 | PR170 | DS-1 | 67 | 92 |
| INV-2 | PR210 | DS-2 | 104 | 80 |
| INV-4 | PR122 | DS-1 | 41 | 194 |
| INV-5 | PV19 | DS-1 | 124 | 93 |
| INV-6 | PV19 | DS-2 | 120 | 83 |
| INV-7 | PR202 | DS-1 | 99 | 77 |
| INV-8 | PR202 | DS-2 | 87 | 114 |
| INV-9 | PR209 | DS-2 | 140 | 76 |
| INV-10 | PV19/PR202 | DS-1 | 155 | 66 |
| INV-11 | PV19/PR202 | DS-2 | 124 | 67 |
| INV-12 | PR254 | DS-1 | 97 | 111 |
| INV-13 | PR254 | DS-2 | 83 | 173 |
| INV-14 | PO71 | DS-2 | 161 | 71 |

From Table 4, it should be clear that the dispersion synergists are able to improve the dispersion quality of the naphtol AS pigments PR170 and PR210, but not of other naphtol AS pigments like PR184. Similarly, the dispersion synergists improved the dispersion quality of the quinacridone pigments in the inkjet inks INV-4 to INV-11. However, although the dispersion quality of the mixed crystal PV19/PR122 was improved, an adequate dispersion quality could not be realized with the mixed crystal PR282 containing a substantial amount of monomethyl quinacridone. A good dispersion quality is also seen for the diketopyrrolo-pyrrole pigments.

Printed samples of the magenta inks with or without the dispersion synergist did not show any visible difference in colour.

Example 2

The dispersion stability can be improved even if the pigments can already be dispersed to a good quality without a dispersion synergist. This is illustrated for the naphtol AS pigment PR210, the quinacridone pigment PR209 and the diketopyrrolo-pyrrole pigment PO71.

Preparation and Evaluation of Non-Aqueous Inkjet Inks

The comparative inkjet inks COMP-16 to COMP-118 and the inventive inkjet inks INV-15 to INV-16 were prepared according to Table 5 in the same manner as for Example 1.

TABLE 5

| wt % of | COMP-16 | COMP-17 | COMP-18 | INV-15 | INV-16 | INV-17 |
|---|---|---|---|---|---|---|
| PR210 | 5.00 | — | — | 4.50 | — | — |
| PR209 | — | 5.00 | — | — | 4.50 | — |
| PO71 | — | — | 5.00 | — | — | 4.50 |
| DS-1 | — | — | — | 0.50 | 0.50 | 0.50 |
| S39000 | 5.00 | 5.00 | 5.00 | 5.00 | 5.00 | 5.00 |
| DEGDEE | 90.00 | 90.00 | 90.00 | 90.00 | 90.00 | 90.00 |

The average particle size and the spectral separation factor SSF were determined to evaluate the dispersion quality and were determined again after a heat treatment of 1 week at 80° C. The results are also listed in Table 6.

TABLE 6

| Inkjet ink | Dispersion quality SSF | Size (nm) | Dispersion Stability % Loss in SSF | Size (nm) |
|---|---|---|---|---|
| COMP-16 | 19 | 470 | 0% | 306 |
| COMP-17 | 130 | 70 | 78% | 245 |
| COMP-18 | 92 | 119 | 37% | 323 |
| INV-15 | 126 | 72 | 0% | 80 |
| INV-16 | 112 | 69 | 28% | 128 |
| INV-17 | 133 | 75 | 2% | 75 |

From Table 6, it should be clear that the dispersion synergist, not only improves the dispersion quality, but also the dispersion stability.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A non-aqueous pigment dispersion comprising:

a non-aqueous dispersion medium, a polymeric dispersant, a pigment, and a dispersion synergist; wherein the dispersion synergist is represented by Formula (I):

Formula (I)

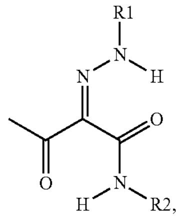

one of R1 and R2 is represented by the group:

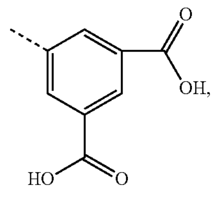

the other one of R1 and R2 is represented by the group:

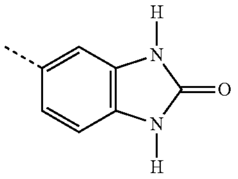

or

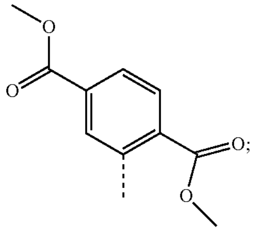

and wherein the pigment is selected from the group consisting of naphthol AS pigments C.I. Pigment Red 170 and 210, diketopyrrolo-pyrrole pigments, unsubstituted quinacridone, dimethyl substituted quinacridone pigments, dichloro substituted quinacridone pigments, and mixed crystals of quinacridones wherein all the quinacridones present in the mixed crystals are selected from the group consisting of unsubstituted quinacridones, dimethyl substituted quinacridones, and dichloro substituted quinacridones.

2. The non-aqueous pigment dispersion according to claim 1, wherein the pigment is selected from the group consisting of C.I. Pigment Violet 19, C.I. Pigment Red 122, C.I. Pigment Red 202, C.I. Pigment Red 209,and mixed crystals thereof.

3. The non-aqueous pigment dispersion according to claim 1, wherein the dispersion synergist is represented by:

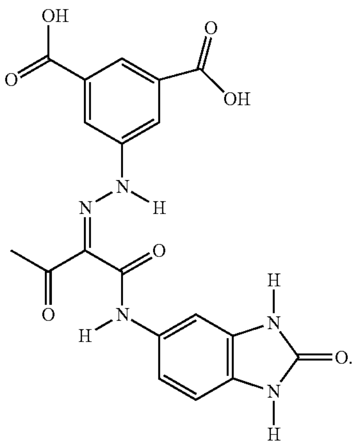 [SMILES: CC(=O)/C(=N/Nc1cc(C(=O)O)cc(C(=O)O)c1)C(=O)Nc1ccc2[nH]c(=O)[nH]c2c1]

4. The non-aqueous pigment dispersion according to claim 2, wherein the dispersion synergist is represented by:

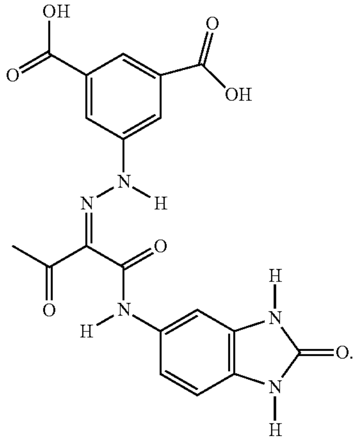 [SMILES: CC(=O)/C(=N/Nc1cc(C(=O)O)cc(C(=O)O)c1)C(=O)Nc1ccc2[nH]c(=O)[nH]c2c1]

5. The non-aqueous pigment dispersion according to claim 1, wherein the dispersion synergist is represented by:

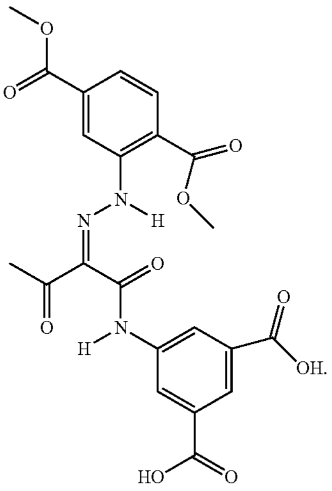 [SMILES: COC(=O)c1ccc(C(=O)OC)c(N/N=C(/C(C)=O)C(=O)Nc2cc(C(=O)O)cc(C(=O)O)c2)c1]

6. The non-aqueous pigment dispersion according to claim 2, wherein the dispersion synergist is represented by:

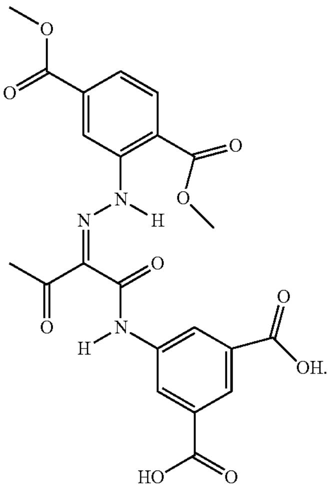 [SMILES: COC(=O)c1ccc(C(=O)OC)c(N/N=C(/C(C)=O)C(=O)Nc2cc(C(=O)O)cc(C(=O)O)c2)c1]

7. The non-aqueous pigment dispersion according to claim 3, wherein the pigment is selected from the group consisting of C.I. Pigment Red 254 and C.I. Pigment Orange 71.

8. The non-aqueous pigment dispersion according to claim 4, wherein the pigment is selected from the group consisting of C.I. Pigment Red 254 and C.I. Pigment Orange 71.

9. The non-aqueous pigment dispersion according to claim 1, wherein the non-aqueous dispersion medium consists of organic solvents.

10. The non-aqueous pigment dispersion according to claim 1, further comprising a component capable of being cured by UV-radiation or e-beams.

11. An inkjet ink comprising:

the non-aqueous pigment dispersion according to claim 1.

12. An inkjet ink set comprising:

one or more inkjet inks as defined by claim 11.

13. An inkjet printing method comprising the steps of:

providing an inkjet ink as defined by claim 11; and jetting the inkjet ink onto an ink-receiver.

* * * * *